United States Patent [19]

Gallegos et al.

[11] Patent Number: 4,514,067
[45] Date of Patent: Apr. 30, 1985

[54] TWIN CAMERA, SHOULDER CARRY, ROTARY, STABILIZATION POD

[76] Inventors: John C. Gallegos, 602 University Ave., Las Vegas, N. Mex. 87701; Tony H. Salazar, Espanola, N. Mex.

[21] Appl. No.: 443,585

[22] Filed: Feb. 14, 1983

[51] Int. Cl.³ .............................................. G03B 17/00
[52] U.S. Cl. ..................................... 354/293; 224/908
[58] Field of Search ................... 354/81, 82, 293, 294; 224/908; 352/95

[56] References Cited

U.S. PATENT DOCUMENTS

| | | | |
|---|---|---|---|
| 2,483,711 | 10/1949 | Roos | 354/293 |
| 2,712,779 | 7/1955 | Tolcher | 354/82 X |
| 2,806,416 | 9/1957 | Jones | 354/82 X |
| 3,984,855 | 10/1976 | Baczynsky | 354/293 |
| 4,272,177 | 6/1981 | Ottenheimek | 354/293 |

OTHER PUBLICATIONS

"The Leica Column", in *Leica Fotografie*, English Ed., 1982.

*Primary Examiner*—John Gonzales
*Attorney, Agent, or Firm*—Marcus L. Bates

[57] ABSTRACT

A twin camera shoulder carry stabilizer device comprising a shoulder stock having mount means on opposed surfaces thereof for supporting opposed cameras. The forward part of the device can be rotated axially to bring either of the two cameras into immediate upright operative position respective to the photographer. Brackets are provided for holding the cameras and may be adjusted forward or backward according to the requirements of the photographer. Each camera is triggered by its own individual flexible release cable in the manner similar to a rifle trigger.

14 Claims, 5 Drawing Figures

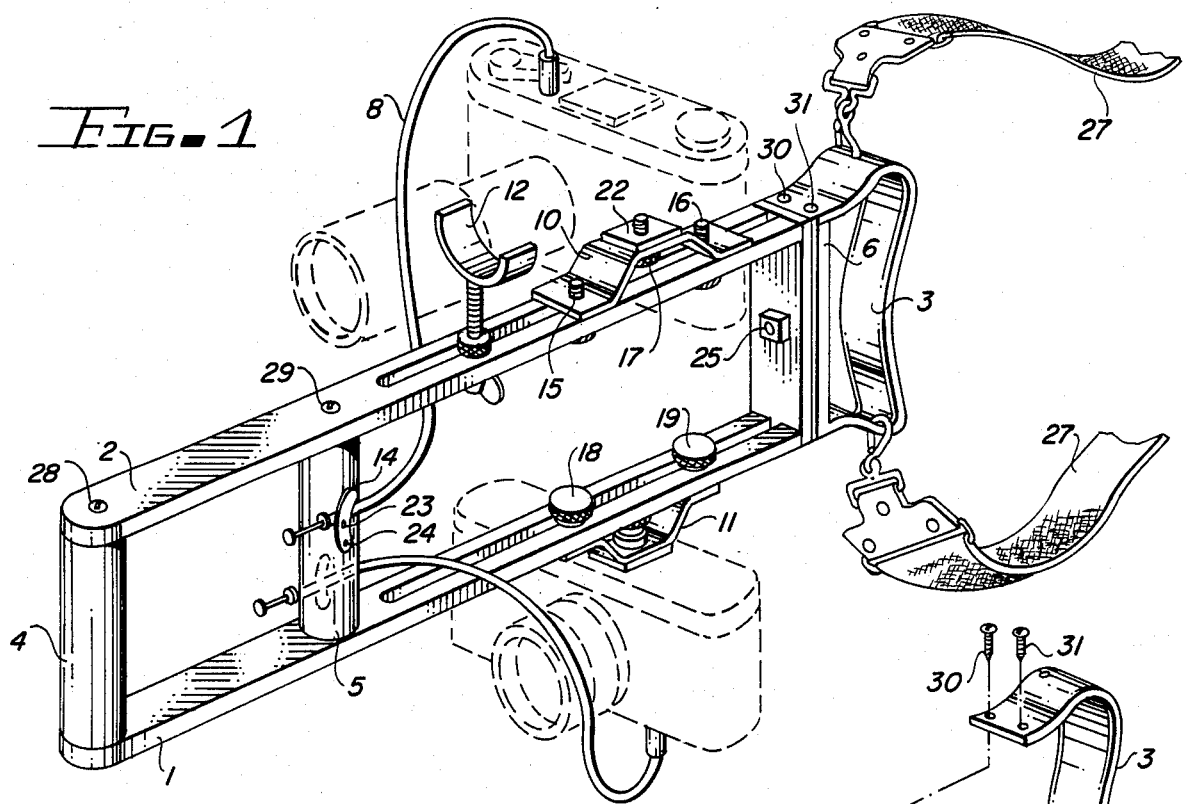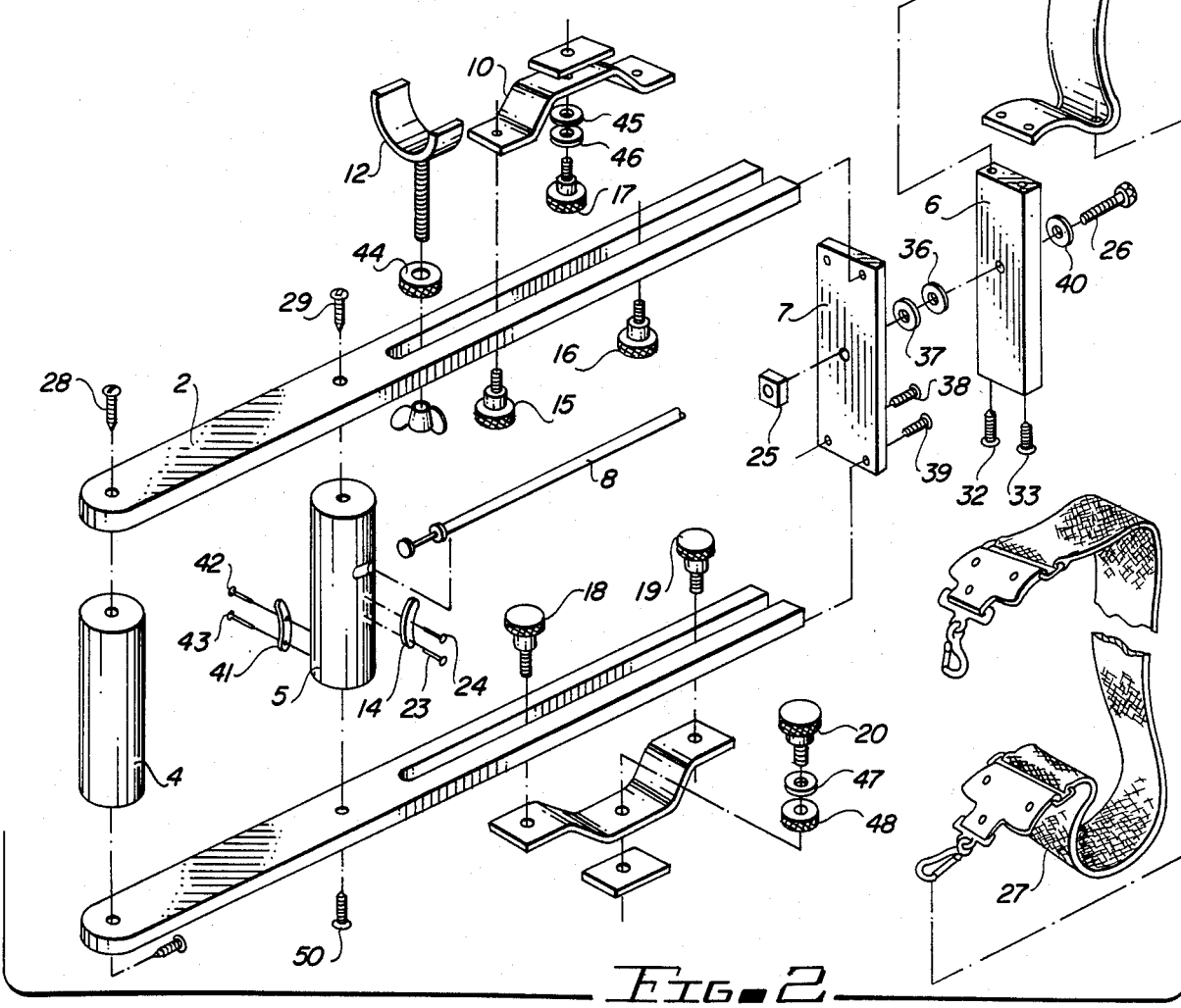

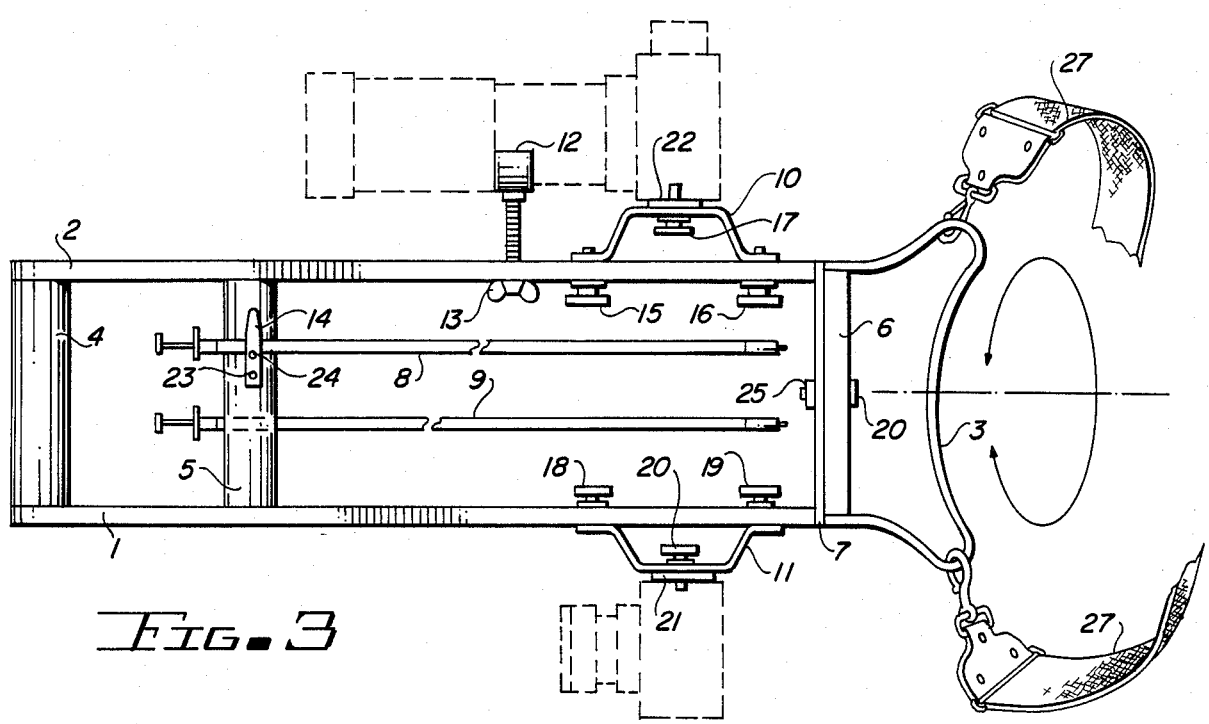
FIG. 3
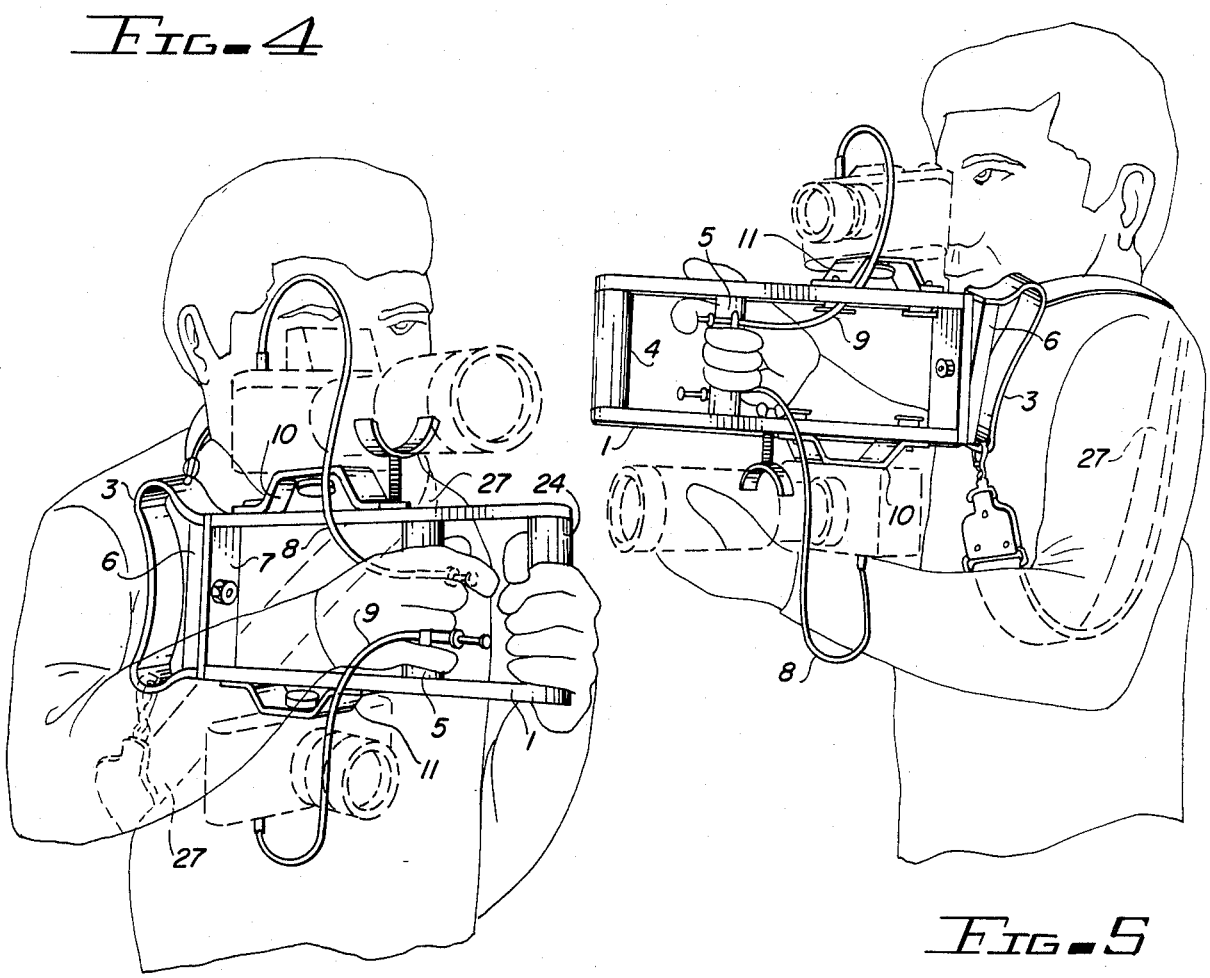
FIG. 4
FIG. 5

TWIN CAMERA, SHOULDER CARRY, ROTARY, STABILIZATION POD

BACKGROUND OF THE INVENTION

This invention is particularly adapted for use by amateurs and professional photographers, especially when involved in action photography outside a studio setting such as nature or sports that may require more than one camera to take full advantage of situations that may arise. A photographer may require an instant change from wide angle to telephoto, or an instant change from one type of film to another without getting all tangled up in the supports, holders, harnesses, and brackets associated with similar devices presently on the market.

The invention here presented provides the photographer with a substantial degree of flexibility in the selection of films, lenses, filters, and enables the safest underarm, waist height carrying position to be achieved for their valuable cameras.

Cross-reference to related applications: U.S. Pat. Nos. of interest to above described camera stabilizer:
2,949,838
3,984,855
3,550,519
4,272,177
3,608,458
3,893,145

SUMMARY OF THE INVENTION

The twin camera, shoulder carry, rotary, stabilization pod of the present invention combines many desirable functions into one light weight easy to carry unit. The pod device is supported by two ends of a strap which enables the photographer to utilize two units, one on each side of the body, thereby doubling his capabilities. When not in use, the units swing under the arm with all camera lenses pointing down and staying close enough to the body to permit wearing an open jacket or overcoat to further protect the equipment and oneself.

Accordingly, a primary object of the present invention is to provide a fast handling, twin camera shoulder carry pod which combines many functions into one, lightweight, compact and inexpensive unit.

Another object of the present invention is to provide a variable resistance fastener means which allows the forward part of a stabilization pod to rotate axially and thereby bring either of two different cameras into immediate operative position.

Another and further object of the present invention is to provide an adjustable camera holding bracket apparatus so that cameras may be moved forward or backward subject to the photographer's requirements.

A still further object of the present invention is to provide a twin camera shoulder carry pod in accordance with the previously mentioned objectives wherein a flexible cable release is provided for each camera.

Another and still further object of the present invention is to provide a twin camera shoulder carry pod in accordance with the previously mentioned objectives wherein appropriate handles are provided for attaching the aforesaid trigger release cables so that the cameras may be triggered in similar fashion to a rifle trigger.

A still further object of the present invention is to provide a twin camera shoulder carry pod which includes therein means for connecting a strap to the shoulder piece thereof to facilitate carrying the entire apparatus.

An additional object of the present invention is to provide a twin camera shoulder carry pod having an adjustable "Y" bracket located immediately forward of each camera mounting bracket to further secure the camera, particularly in the case of telephoto lenses.

BRIEF DESCRIPTION OF THE DRAWINGS

FIG. 1 is an isometric view of the twin camera, shoulder carry, rotary, stabilization pod, made in accordance with the present invention, with two cameras associated therewith being illustrated in dash lines in attached position thereon;

FIG. 2 is an enlarged, exploded view of the apparatus disclosed in FIG. 1;

FIG. 3 is a side view of the apparatus seen in FIG. 1, with the cameras being indicated in dash lines; and, FIGS. 4 and 5 are perspective views illustrating use of the device seen in the foregoing figures, with the use of telephoto lens in FIG. 4 and thereafter rotating the front part of the device 180 degrees thus enabling rapid change to another of the cameras in a matter of one or two seconds.

DETAILED DESCRIPTION OF THE INVENTION

The basic forward part of the device for holding two cameras includes two inletted hardwood slats, 1 and 2, shown in FIGS. 1, 2, and 3, held together by two large hardwood dowels or handles, 4 and 5, and one aluminum alloy back plate 7. The basic shoulder piece which remains against the user's shoulder at all times while the forward part of the device rotates to axially bring either camera into operation is comprised of an aluminum alloy slat 3, bent to proper shape and attached with four wood screws 30, 31, 32, and 33, to a hardwood rectangular piece 6, which in turn is secured by nut and bolt, 25 and 26, to an aluminum alloy back plate 7. Nut 25 and bolt 26 allow the forward part of the device to swivel or rotate axially to thereby bring either of the illustrated cameras into play.

FIG. 2 shows both opposed cable release retainer springs 41 and 14. The retainer springs are attached to dowel handle 5 by screws 23 and 24; and, 42 and 43, as noted in FIGS. 1 and 3. Screws 28, 49, 29 and 50 secure the dowel handles to the inletted hardwood slats. In FIGS. 1 and 2, screws 34, 35, 38, and 39 secure the aluminum alloy back plate 7 to the rear part of the inletted slats 1 and 2. In FIG. 2, "Y" bracket 12 is held in place and adjusted by round nut 44 and wing nut 13. Note that the "Y" bracket may be adjusted up or down or toward the front of the device or toward the shoulder piece as may be required according to the lens being used on the camera. The thin rubber mounting mats 21 and 22, respectively, are suitably attached or glued to the camera mounting brackets 10 and 11, respectively, which are held to the hardwood slats 1 and 2 by knurled bolts 15, 16, 18, and 19. Washers 45, 46, 47, and 48 allow for adjustment to individual cameras as may be needed. Washers 36, 37, and 40 allow for adjustment of axial tension against the shoulder piece. Strap member 27 is the carrying strap that permits underarm toting of the device and is attached to the shoulder piece 3.

The simplicity of the device made in accordance with the present invention lends itself to economical mass production. The basic structure can use a variety of aluminum alloys for the shoulder piece and camera brackets while the main body parts can utilize any kind of hardwood.

The variety of screws, bolts, nuts, springs, carrying strap and release cables may be purchased at any hardware or camera store.

One skilled in the art, having digested the above disclosure, will appreciate that the shoulder mounted apparatus of the present invention can be used to support a plurality of cameras in a manner that enables each camera to be sequentially brought into operative upright position. The apparatus disclosed herein includes a main frame and a shoulder piece. The main frame is comprised of slats 1 and 2 which are held together by means of a handle 4 and 5 and a back plate 7. The main frame is rotatably affixed to the shoulder piece by a fastener means 25, 26 which forms a swivel along the longitudinal axis of the apparatus and thereby enables the main frame to be rotated along its longitudinal axis respective to the shoulder piece whereby either of the cameras which may be mounted to opposed frame surfaces are selectively brought into operative position. The trigger means located at handle 5 and connected to the distal ends of cables 8 and 9 remotely and selectively control the cameras. A single strap 27 has the terminal ends thereof releasably attached to spaced locations on the shoulder piece so that the main frame can be carried on either shoulder with each camera of each pod being suspended in a protected area of the photographer's body as noted above.

I claim:

1. A shoulder mounted apparatus for supporting a plurality of cameras in a manner that enables each camera to be sequentially brought into operative, upright position;

said apparatus comprises a main frame and a shoulder piece; said main frame includes spaced members having opposed parallel surfaces, said members have a far end opposed to a near end; said members being held together in fixed relationship by at least one handle which is affixed at the far end of said members and a back plate which is affixed at the near end of said members;

a shoulder piece having a shoulder receiving side made into a configuration which generally conforms to one's shoulder, said shoulder piece includes an opposed side for attachment to said back plate;

swivel means located along a longitudinal axis of said main frame by which said back plate and said opposed side of the shoulder piece are affixed to one another so that said main frame can be rotated along the longitudinal axis thereof respective to said shoulder piece;

said spaced members have confronting sides which are held in fixed spaced relationship by said handle and said back plate; means formed on said opposed surfaces for releasably attaching a camera thereto so that a camera attached to one opposed surface is opposed to a camera attached to the other opposed surface; so that said shoulder piece can be brought to bear against one's shoulder while said main frame can be rotated respective to said shoulder piece and thereby sequentially bring a camera mounted on the opposed parallel surfaces into operative position.

2. The apparatus of claim 1 and further including a trigger means mounted in proximity of said handle; means by which said trigger means can selectively actuate a shutter associated with a camera which may be mounted on either opposed surface.

3. The apparatus of claim 1 and further including strap means having distal ends attached at spaced locations respective to said shoulder piece so that said shoulder mounted apparatus can be supported from one's shoulder with the parallel surfaces being vertically disposed with any cameras which may be supported on the main frame being located with the lenses thereof looking down.

4. The apparatus of claim 1 and further including means by which a camera which may be supported on either parallel surface can be adjustably moved longitudinally along said member and vertically respective to either parallel surface.

5. The apparatus of claim 4 wherein a trigger means is mounted in proximity of said handle; means by which said trigger means can selectively actuate a shutter associated with a camera mounted on either parallel surface;

and further including a strap means having distal ends which are attached at spaced locations to said shoulder piece so that the apparatus can be slung under the arm of a person while the strap supports the apparatus in a vertical position.

6. A twin camera, shoulder carry, rotary stabilization pod by which either of several cameras can be selectively brought into operative position relative to a photographer; said pod comprises a main elongated frame rotatably affixed to a shoulder piece;

said shoulder piece has a near end adapted to be placed against the shoulder of a photographer, and a far end which is rotatably affixed to said main frame;

said main frame includes elongated opposed slat members, each slat member has confronting faces and opposed faces, mount means on said opposed faces by which a camera can be removably attached to said main frame;

handle means joining said opposed slat members together; fastener means by which said shoulder piece rotatably supports said main frame in a manner to rotate said main frame about the longitudinal axis thereof; whereby, either of opposed cameras which may be supported on a slat can be sequentially brought into an upright operative position.

7. The apparatus of claim 6 and further including a trigger means mounted in proximity of said handle; means by which said trigger means can selectively actuate a shutter associated with a camera which may be mounted on either slat.

8. The apparatus of claim 6 and further including strap means having distal ends attached at spaced locations to said shoulder piece so that the apparatus can be hung from one's shoulder with the main frame and shoulder piece being located adjacent to one's waist and thereby protect any camera which may be supported on said slats.

9. The apparatus of claim 6 and further including means by which a camera which may be supported by a slat can be adjustedly moved longitudinally along said slat and vertically moved perpendicularly respective to the slat.

10. The apparatus of claim 9 wherein there is further included a trigger means mounted in proximity of said handle; means by which said trigger means can selectively actuate a shutter associated with a camera which may be mounted on either said slat;

and further including strap means having distal ends attached at spaced locations to said shoulder piece so that the entire apparatus can be hung from one's shoulder with the main frame gravitating into a vertical position.

11. Apparatus for supporting a plurality of cameras against one's shoulder in a manner that enables each camera to be sequentially brought into operative upright position;

said apparatus comprises a main frame and a shoulder piece, said main frame includes spaced member having opposed surfaces, said members have a far end opposed to a near end; said members being held together in fixed relationship by at least one handle which is affixed at the far end of said members; a back plate which is affixed at the near end of said members;

a shoulder piece having a shoulder receiving near end made into a configuration which generally conforms to one's shoulder, said shoulder piece includes a far end attachment to said back plate;

swivel means located along a longitudinal axis of said main frame by which said back plate and said far end of said shoulder piece are rotatably affixed to one another so that said main frame can be rotated along the longitudinal axis thereof respective to said shoulder piece;

said main frame members have confronting sides which are held in fixed spaced relationship by said handle and said pack plate; means formed on the main frame members for releasably attaching a camera thereto so that a camera attached to one main frame member is opposed to a camera attached to the other main frame member; so that said shoulder piece can be brought to bear against one's shoulder while said main frame can be rotated respective to said shoulder piece and thereby sequentially bring a camera mounted on the opposed surfaces into operative position.

12. The apparatus of claim 11 and further including a trigger means mounted in proximity of said handle; means by which said trigger means can selectively actuate a shutter associated with a camera which may be mounted on either surface of the main frame member.

13. The apparatus of claim 11 and further including strap means having distal ends attached at spaced locations respective to said shoulder piece so that said shoulder mounted apparatus can be supported from one's shoulder with the parallel surfaces being vertically disposed with any camera which may be supported on the main frame being located with the lens thereof looking down.

14. The apparatus of claim 13 wherein there is further included a trigger means mounted in proximity of said handle; means by which said trigger means can selectively actuate a shutter associated with a camera which may be mounted on either surface of the main frame member.

* * * * *